United States Patent
Li et al.

(10) Patent No.: US 10,075,741 B2
(45) Date of Patent: Sep. 11, 2018

(54) SYSTEM AND CONTROL PROTOCOL OF LAYERED LOCAL CACHING FOR ADAPTIVE BIT RATE SERVICES

(71) Applicant: Broadcom Corporation, Irvine, CA (US)

(72) Inventors: Yong Li, San Diego, CA (US); Xuemin Chen, Rancho Santa Fe, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 970 days.

(21) Appl. No.: 13/948,100

(22) Filed: Jul. 22, 2013

(65) Prior Publication Data

US 2015/0012707 A1    Jan. 8, 2015

Related U.S. Application Data

(60) Provisional application No. 61/842,922, filed on Jul. 3, 2013.

(51) Int. Cl.
*H04N 21/231* (2011.01)
*H04L 29/08* (2006.01)

(52) U.S. Cl.
CPC . *H04N 21/23106* (2013.01); *H04L 29/08729* (2013.01); *H04L 67/2842* (2013.01); *H04L 67/2885* (2013.01); *H04L 67/34* (2013.01)

(58) Field of Classification Search
None
See application file for complete search history.

(56) References Cited

U.S. PATENT DOCUMENTS

| 6,085,193 | A  | * | 7/2000  | Malkin        | G06F 17/30902 |
| 6,751,710 | B2 | * | 6/2004  | Gharachorloo  | G06F 12/0826 711/141 |
| 7,324,555 | B1 | * | 1/2008  | Chen          | H04N 7/17336 348/E5.008 |
| 7,751,628 | B1 | * | 7/2010  | Reisman       | G11B 27/034 382/232 |
| 8,081,566 | B1 | * | 12/2011 | Ashwood-Smith | H04L 47/122 370/230 |
| 8,543,702 | B1 | * | 9/2013  | Marshall      | H04L 67/2885 709/203 |

(Continued)

*Primary Examiner* — Ricky Chin
(74) *Attorney, Agent, or Firm* — McDermott Will & Emery LLP

(57) ABSTRACT

A system for layered local caching of downstream shared media in a hierarchical tree network arrangement includes a first network node on a first distribution network having a first caching controller. The first network node configured to store a video segment transmitted on the first distribution network based on a first instruction received by the first caching controller from a central caching controller communicatively coupled to the first distribution network. The central caching controller is located upstream from the first network node. The system includes a second network node on a second distribution network having a second caching controller and communicatively coupled to the first network node. The second network node configured to store a video segment transmitted on the second distribution network based on a second instruction received by the second caching controller from the first caching controller.

17 Claims, 7 Drawing Sheets

(56) References Cited

U.S. PATENT DOCUMENTS

| | | | | |
|---|---|---|---|---|
| 8,793,327 B2* | 7/2014 | Surtani | G06F 9/5027 | 707/783 |
| 9,276,850 B2* | 3/2016 | Lee | H04L 45/742 | |
| 9,692,849 B2* | 6/2017 | Puthalath | H04L 67/2842 | |
| 2003/0236961 A1* | 12/2003 | Qiu | H04L 67/2852 | 711/170 |
| 2004/0148279 A1* | 7/2004 | Peleg | G06F 12/0813 | |
| 2007/0101377 A1* | 5/2007 | Six | H04N 7/17336 | 725/86 |
| 2007/0208737 A1* | 9/2007 | Li | H04L 67/26 | |
| 2008/0040555 A1* | 2/2008 | Iyer | G06F 12/0811 | 711/133 |
| 2008/0147974 A1* | 6/2008 | Madison | G06F 12/0897 | 711/118 |
| 2008/0234990 A1* | 9/2008 | Bowers | G06F 19/701 | 703/1 |
| 2008/0256220 A1* | 10/2008 | Bachmann | H04W 8/04 | 709/222 |
| 2008/0282040 A1* | 11/2008 | Doring | G06F 12/0862 | 711/141 |
| 2009/0132614 A1* | 5/2009 | Surtani | G06F 17/30575 | |
| 2011/0082982 A1* | 4/2011 | Harvell | G06F 17/30902 | 711/122 |
| 2011/0107030 A1* | 5/2011 | Borst | H04N 21/23106 | 711/118 |
| 2012/0136945 A1* | 5/2012 | Lee | H04L 67/2838 | 709/206 |
| 2012/0166793 A1* | 6/2012 | Kim | H04L 9/0825 | 713/150 |
| 2012/0209942 A1* | 8/2012 | Zehavi | H04L 29/08729 | 709/213 |
| 2013/0041972 A1* | 2/2013 | Field | H04L 29/08729 | 709/213 |
| 2013/0073808 A1* | 3/2013 | Puthalath | H04L 67/1095 | 711/119 |
| 2013/0151780 A1* | 6/2013 | Daly | G06F 12/0897 | 711/122 |
| 2013/0159472 A1* | 6/2013 | Newton | H04L 67/2852 | 709/219 |
| 2013/0212333 A1* | 8/2013 | Morosawa | G06F 12/0817 | 711/130 |
| 2014/0149532 A1* | 5/2014 | Kim | H04L 67/2852 | 709/213 |
| 2014/0189772 A1* | 7/2014 | Yamagishi | H04N 21/2225 | 725/116 |
| 2014/0215543 A1* | 7/2014 | Li | H04N 21/64738 | 725/115 |
| 2014/0280679 A1* | 9/2014 | Dey | H04L 67/2842 | 709/213 |
| 2014/0365599 A1* | 12/2014 | Kim | H04L 67/2857 | 709/213 |
| 2015/0003475 A1* | 1/2015 | Savolainen | H04L 69/324 | 370/474 |
| 2015/0112951 A1* | 4/2015 | Narayanamurthy | G06F 17/30132 | 707/694 |
| 2015/0293854 A1* | 10/2015 | Kalamatianos | G06F 12/0864 | 714/723 |
| 2016/0019089 A1* | 1/2016 | Jeong | G06F 9/4881 | 718/102 |
| 2016/0072678 A1* | 3/2016 | Dong | H04W 4/70 | 370/254 |
| 2016/0085677 A1* | 3/2016 | Loh | G06F 12/0815 | 711/143 |
| 2016/0110288 A1* | 4/2016 | Bronson | G06F 12/0815 | 711/145 |
| 2016/0210239 A1* | 7/2016 | Wang | G06F 12/0811 | |

\* cited by examiner

SYSTEM AND CONTROL PROTOCOL OF LAYERED LOCAL CACHING FOR ADAPTIVE BIT RATE SERVICES

CROSS-REFERENCE TO RELATED APPLICATIONS

The present application claims the benefit of U.S. Provisional Patent Application Ser. No. 61/842,922, titled "SYSTEM AND CONTROL PROTOCOL OF LAYERED LOCAL CACHING FOR ADAPTIVE BIT RATE SERVICES," filed on Jul. 3, 2013, which is hereby incorporated by reference in its entirety for all purposes.

TECHNICAL FIELD

The present description relates generally to adaptive bit rate services, and more particularly, but not exclusively, to layered local caching for adaptive bit rate services.

BACKGROUND

Adaptive Bit Rate (ABR) technology is emerging as a popular media technology to support Internet Protocol Television (IPTV) services for broadband users. In an ABR streaming system, a content item is encoded into multiple streams of different bit rates, with each stream being divided into sequential segments of a given duration (e.g. 2-10 seconds). An approach to provide broadband services to multi-dwelling unit (MDU) users is to extend a passive optical network connection to the boundary of a MDU and then distribute the broadband services over physical connections that are specific to the MDU in a broadcast nature. In this respect, IPTV services can be served on a subscriber data network that is configured in a tree topology, with the network rooted at a root node (e.g., at an optical line terminator (OLT)) and branching out to coax media converters (CMCs) via a passive optical distribution network, and further to gateway devices (GWs) that serve leaf devices such as set-top boxes and other operably-connected computing devices (e.g., personal computers and mobile devices) via a coax cable distribution network.

To provide ABR-based IPTV services, an ABR Client uses HTTP protocol to retrieve video program segments from an ABR Server. The HTTP protocol is based on IP unicasting. However, since ABR uses IP unicast, the distribution creates significant bandwidth requirements across the optical and cable distribution networks in high-user-density MDU environments. For example, if multiple users watch the same live TV programming channel at the same time, multiple copies of the same sequence of video segments need to be streamed from the wide-area-network (WAN) side to the corresponding ABR clients. This can overload the optical and cable distribution networks if too many ABR video streams are transported over them at the same time, because of the tree structures of these two networks.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
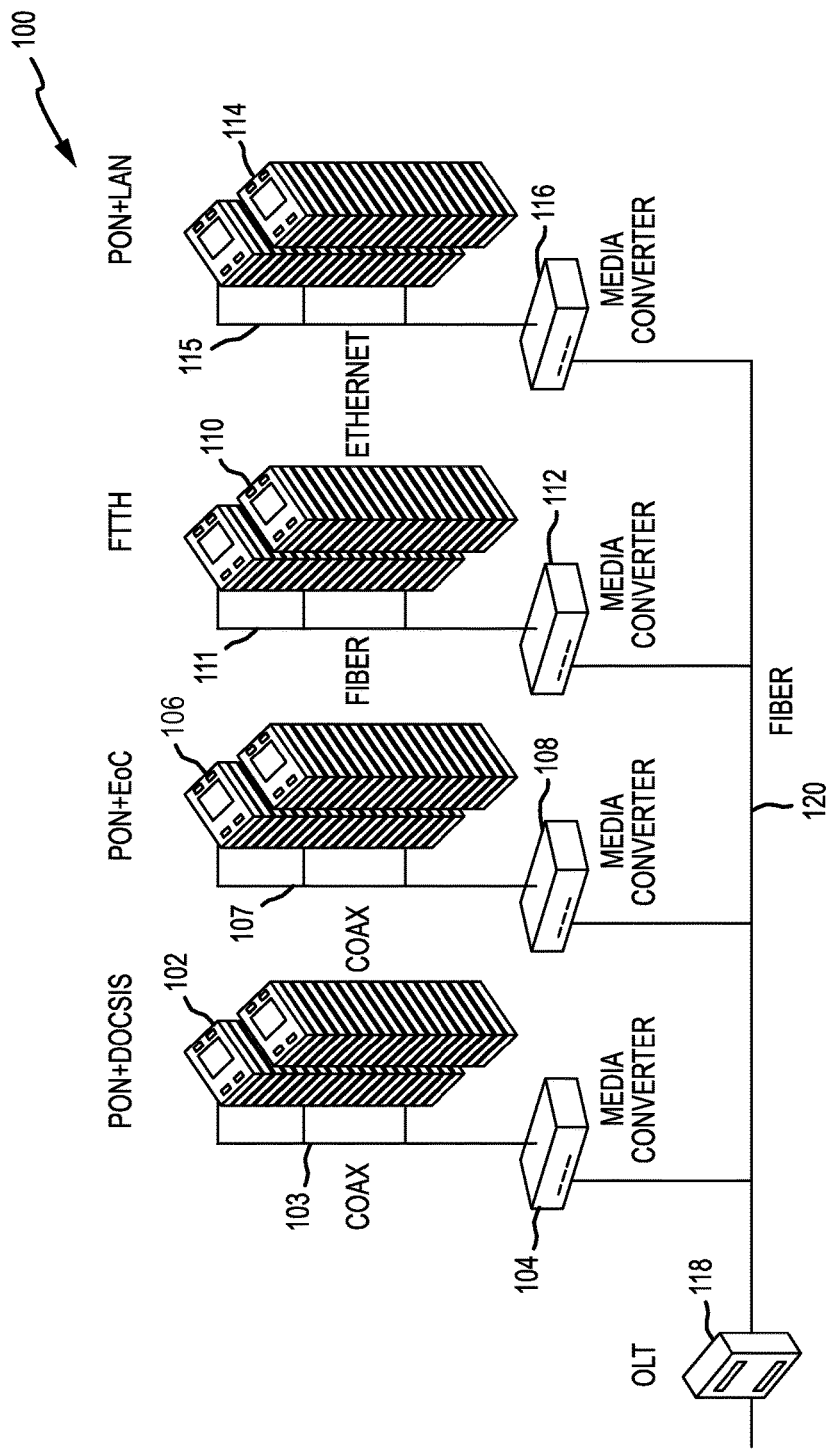
FIG. 1 illustrates an example multi-dwelling unit environment in which adaptive bit rate services may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject disclosure provides a layered local caching scheme, where ABR video segments can be cached locally at network nodes (e.g., CMCs, GWs) of one or more distribution networks (e.g., passive optical network, cable coax). The CMCs that connect to the OLT via optical distribution network can serve as a first cache layer (or CMC layer), and the GWs that connect to the CMCs via cable distribution network can serve as a second cache layer (or GW layer).

Because of the broadcast nature of the optical and cable distribution networks, ABR traffic can be seen across different network branches of each distribution network. In one or more implementations, ABR video segments targeted for a particular network branch at the GW layer can also be seen by GWs of neighboring network branches, which in turn can be cached locally by the GWs of the neighboring network branches if the video segments have not yet been locally cached by the GWs. As a result, a GW of a neighboring network branch can respond to subsequent requests for the same ABR video segments from the leaf devices served by the GW if the requested ABR video segments are locally cached at the GW, thus avoiding the need to send requests to the CMCs for the same ABR video segments and having the requested ABR video segments transmitted downstream to congest the optical and coax distribution networks, for example.

In some implementations, a system for layered local caching of downstream shared media in a hierarchical tree network arrangement includes a first network node on a first distribution network having a first caching controller. The first network node configured to store a video segment transmitted on the first distribution network based on a first instruction received by the first caching controller from a central caching controller communicatively coupled to the first distribution network. The central caching controller is located upstream from the first network node. The system also may include a second network node on a second distribution network having a second caching controller and communicatively coupled to the first network node. The second network node configured to store a video segment transmitted on the second distribution network based on a second instruction received by the second caching controller from the first caching controller. The first network node is located upstream from the second network node.

In this respect, no duplicated ABR video segments are transmitted on upper-layer or upstream network of a network node, irrespective of how many MDU users are watching the same program simultaneously in the lower-layer or downstream network of the network node. In turn, the layered local caching scheme significantly reduces the bandwidth requirements while allowing an increasing number of MDU users to access the same program.

FIG. 1 illustrates an example multi-dwelling unit (MDU) environment 100 in which adaptive bit rate services may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 1, each multi-dwelling unit (MDU) environment has its own physical wiring and corresponding broadband distribution technology within the building. The example MDU environment 100 includes buildings 102, 106, 110 and 114, which may be multi-dwelling units (MDUs), houses, offices, or any generally structures. In one or more implementations, one or more of the buildings 102, 106, 110, 114 may represent a collection of separate structures, such as a subdivision of separate houses.

The access data networks for many countries have been designed to fit the MDU environment 100, for example. In countries such as China, most residential broadband users live in the MDU environment 100. Even in the rest of countries (such as the United States of America), the MDU broadband users also represent an important segment of the market. An emerging approach of providing broadband services to the MDU users is to extend xPON (EPON or GPON) connection to the boundary of a MDU and then distribute the services over physical connections that are specific to the MDU environment 100. Such connections may include, but not limited to, Coax, Ethernet, and fiber. A central element in supporting this approach is a media converter that performs the necessary conversion between the xPON media and the MDU-specific media.

By way of illustration, the example MDU environment 100 includes building 102 communicatively coupled to media converter 104 via a coax transmission line 103. As such, the broadband distribution technology to building 102 includes a fiber to coax interconnection to support a PON+DOCSIS architecture. The example MDU environment 100 also includes building 106 communicatively coupled to media converter 108 via a coax transmission line 107. The broadband distribution technology to building 106 includes a fiber to coax interconnection to support a PON+Ethernet-over-Coax (EoC) architecture. The example MDU environment 100 also includes building 110 communicatively coupled to media converter 112 via an optical transmission line 111 (or fiber optic transmission line). The broadband distribution technology to building 110 includes a fiber-to-fiber interconnection to support a fiber-to-the-home (FTTH) architecture. The example MDU environment 100 further includes building 114 communicatively coupled to media converter 116 via an Ethernet transmission line 115. The broadband distribution technology to building 114 includes a fiber to Ethernet interconnection to support a PON+local area network (LAN) architecture.

There are two distinct characteristics of these networks: a) they have a tree topology, where the network is rooted at a central optical device 118 (e.g. OLT) and branched out in multiple layers to reach leaf devices (e.g. STBs, tablets, PCs) in customer homes; b) they serve a user population of high density. A typical example is a network with the China-DOCSIS (C-DOCSIS) system, where the xPON is extended from the central optical device 118 (or OLT) to a set of CMC's (coax media converters) via fiber transmission line 120 that in turn serve users within various buildings via the coax distribution network.

By way of example, the C-DOCSIS system is very efficient in providing multicast-based TV services (e.g. via IP multicast). In this case, even when all users tune to the same channel, only a single copy of the program is carried on any given branch of the network tree. However, these networks pose a serious challenge for unicast-based services such as ABR (adaptive bit rate). If all users tune to the same channel, each branch of the network tree would have to carry an aggregated N copies of the same program, where N is the number of users connected to the branch (probably across more than one layer). This aggregation creates exponentially higher bandwidth requirements across the C-DOCSIS network from the leaf nodes to the root node. For instance, with some "typical" assumptions about the ABR-based IPTV deployment scenario for C-DOCSIS, the total CMC downstream bandwidth requirement may reach 6 gigabits-per-second (Gbps) and that of cental OLT 118 may reach 60 Gbps. Such bandwidth requirements may not be practical under the example MDU environment 100.

Figure 2:
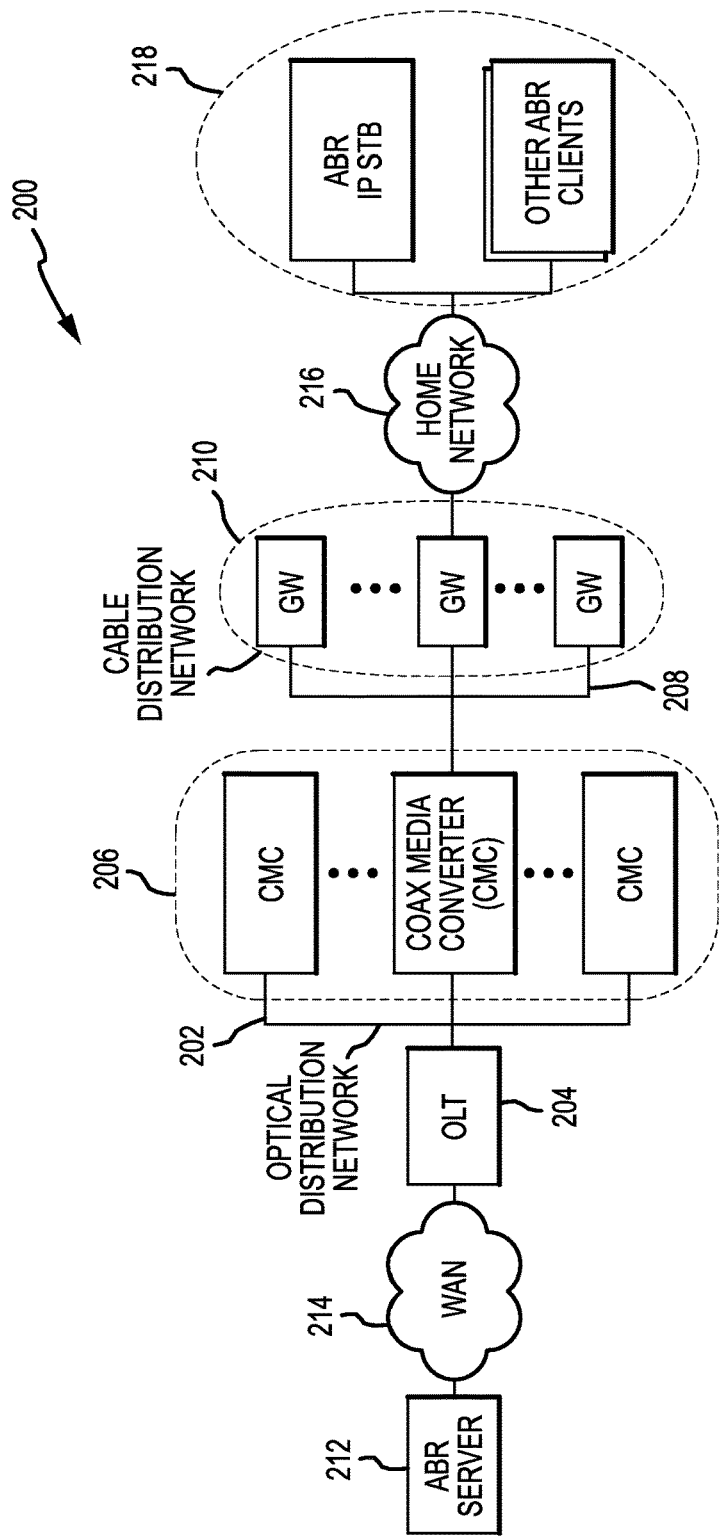
FIG. 2 illustrates an example network environment in which adaptive bit rate services may be implemented in accordance with one or more implementations.

FIG. 2 illustrates an example network environment 200 in which adaptive bit rate services may be implemented in accordance with one or more implementations. As shown in FIG. 2, the example network environment 200 includes an optical distribution network 202, optical line terminator 204, coax media converter network 206, cable distribution network 208, gateway network 210, adaptive bit rate server 212, wide area network 214, home communication network 216 and adaptive bit rate clients 218. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 200 represents a C-DOCSIS network that may be based on the "PON+DOCSIS" architecture. In the example network environment 200, the optical distribution network 202 extends the PON (e.g. EPON) services from the centralized OLT 204 to multiple coax media converters (CMCs) (or coax media converter network 206) located within their served MDUs.

As population densities increase in urban areas, broadband service providers are moving fiber optic network endpoints closer to buildings (or areas) that are associated with high population densities, such as into the basements of multi-dwelling units (MDUs). For example, a broadband service provider may place fiber optic network endpoints, e.g. optical network terminals (ONTs), in the basements of large high-rise apartment buildings that include several apartments. The broadband service provider's headend may include the optical line terminal (OLT) 204 that is communicatively coupled to the ONTs, e.g. via fiber optic cables. The ONTs may be individually coupled, via a non-optical medium, such as a coaxial transmission line, to gateway devices 210 that are located in, and provide broadband service (e.g. television, telephone, and/or Internet) to, user devices 218 in the individual dwelling units. The user devices 218 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for adaptive bit rate streaming, and rendering, of multimedia content and/or can be coupled to such a device. Thus, the ONTs may each include, and/or may be coupled to, a media converter 206 that converts optical signals received over the optical distribution network 202 from the OLT 204 of the headend to electric signals that can be transmitted over the non-optical network medium 208 (e.g., cable distribution network) to the gateway devices 210 in the individual dwelling units, and vice-versa.

The CMC 206 may be responsible for performing the transport and protocol conversions between the PON and the C-DOCSIS. The C-DOCSIS services are provided to individual users (e.g., user devices 218) via the CMC 206 on the terminal side and the gateway 210 with embedded cable modem on the user side. The GW 210 provides broadband accesses to various IP devices (e.g., user devices 218) in the home via the home communication network 216. The relevant IP devices include ABR-based IP STBs and other ABR clients such as tablets and smart phones. FIG. 2 illustrates how the ABR service is offered over the C-DOCSIS network.

Two characteristics of the C-DOCSIS network shown in FIG. 2 may be the following: (a) all the packets that are transmitted by the OLT 204 on the PON fiber link (e.g., optical distribution network 202) will reach all CMC's 206 that are on the same link (probably after multiple stages of optical splitters). In this regard, the PON fiber link downstream is a broadcast media by nature. That is, a CMC may be able to "see" all downstream packets regardless of whether the packets target the same CMC or any other CMC's communicatively coupled to the same downstream channel; (b) all the packets that are transmitted by a CMC on the coax cable link (e.g., cable distribution network 208) will reach all GW's 210 that are on the same coax link (probably after multiple stages of RF amplifiers/taps/splitters). In this regard, the coax cable link downstream is a broadcast media by nature. That is, a GW may be configured to "see" all downstream packets regardless of whether these packets target the same GW or any other GW's on the same downstream channel.

ABR is emerging as the popular technology to support IPTV services for broadband users. However, since ABR utilizes IP unicast, ABR poses serious a bandwidth-requirement challenge in a high-user-density MDU environment. The hierarchical network arrangement of the ONTs/media converters 206, gateway devices 210, and user devices 218 may be beneficial for broadcast transmissions from the headend (e.g., ABR server 212) to the user devices 218, e.g. a single transmission that is being transmitted from the headend to multiple user devices. However, the hierarchical network arrangement may result in network congestion when multiple simultaneous unicast transmissions are being transmitted from the headend to the user devices 218, e.g. when the user devices 218 are simultaneously accessing adaptive bit rate (ABR) streaming content from the headend.

Figure 3:
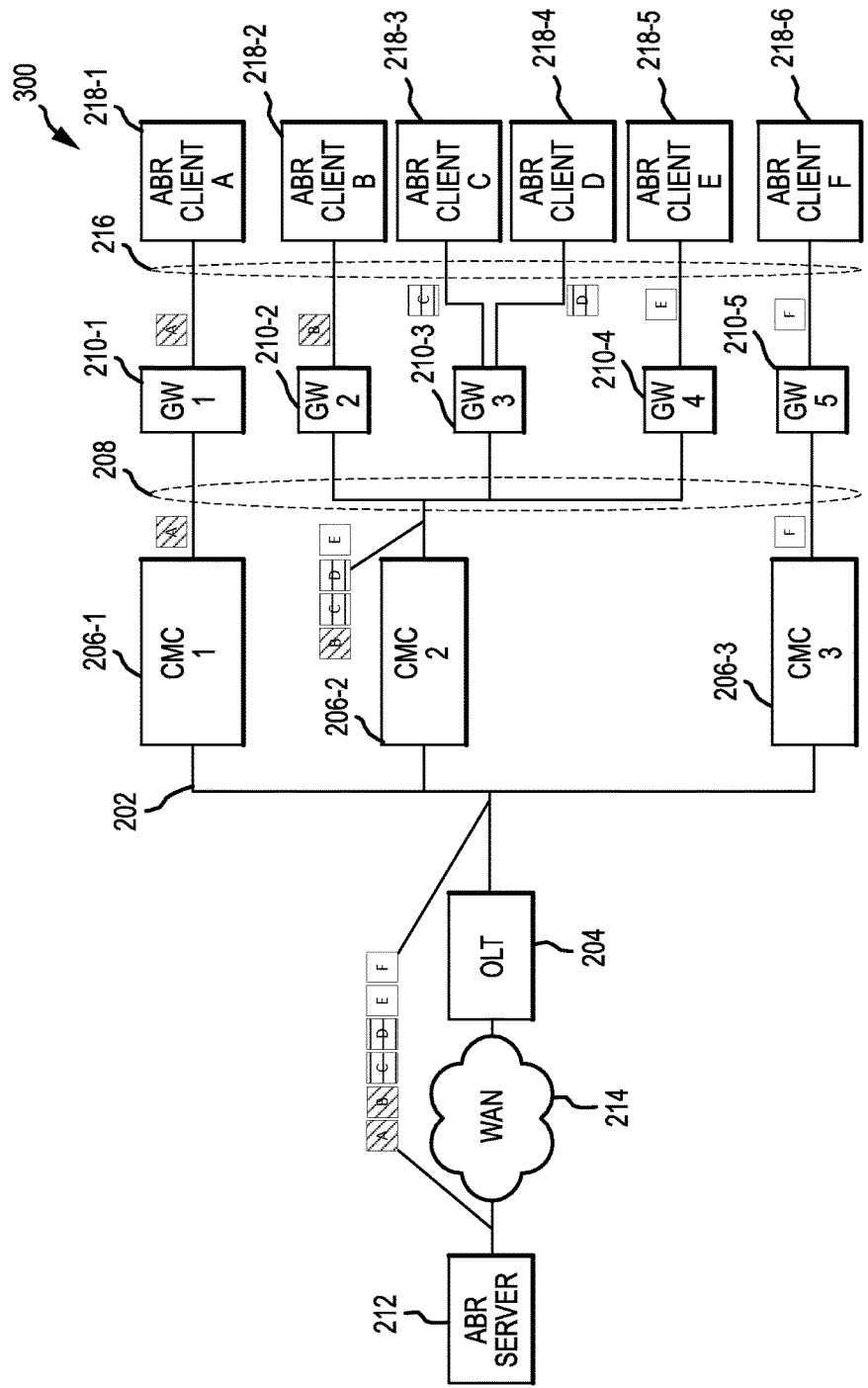
FIG. 3 illustrates an example network environment in which unicasting for adaptive bit rate services may be implemented in accordance with one or more implementations.

FIG. 3 illustrates an example network environment 300 in which unicasting for adaptive bit rate services may be implemented in accordance with one or more implementations. The example network environment 300 includes optical distribution network 202, optical line terminator 204, coax media converters 206-1, 206-2, 206-3, cable distribution network 208, gateway devices 210-1, 210-2, 210-3, adaptive bit rate (ABR) server 212, wide area network 214, home communication network 216, and adaptive bit rate (ABR) clients 218-1, 218-2, 218-3, 218-4, 218-5, 218-6. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

To provide ABR-based IPTV services, any one of the ABR clients 218-1, 218-2, 218-3, 218-4, 218-5, 218-6 uses HTTP protocol to retrieve video program segments from the ABR server 212. The HTTP protocol is based on IP unicasting. If multiple users watch the same live TV programming channel at the same time, multiple copies of the same sequence of video segments need to be streamed from the ABR server 212 via WAN 214 to the corresponding ABR clients. The duplication of the same sequence of video segments can overload the optical distribution network 202 and the cable distribution network 208 if too many video streams are transported over them at the same time, because of the broadcast nature of these two networks in downstream.

The aforementioned traffic loading pattern is illustrated in FIG. 3, where ABR clients 218-1 ("A") and 218-2 ("B") stream the same video program "Red", ABR clients 218-3 ("C") and 218-4 ("D") stream the same program "Green", and ABR clients 218-5 ("E") and 218-6 ('F") stream the same program "Blue". As shown in FIG. 3, the packets for each program are duplicated on the optical distribution network 202, and the packets for the "Green" program are duplicated on the cable distribution network 208 of CMC 206-2 ("CMC 2").

To address the bandwidth challenge for ABR in the C-DOCSIS type of networks, the subject disclosure provides a layered local caching scheme that will be discussed in further detail below in FIG. 5. In this scheme, the ABR video segments are cached locally on each CMC and GW. Such caching can be effective since each CMC and GW are able to "see" all the traffic on the CMC-attached optical distribution network and the GW-attached cable distribution network, respectively, due to the broadcast nature of these two layers of the network. With this caching scheme, no duplicated ABR video segments are transmitted on the network, regardless how many users are watching the same program simultaneously.

Figure 4:
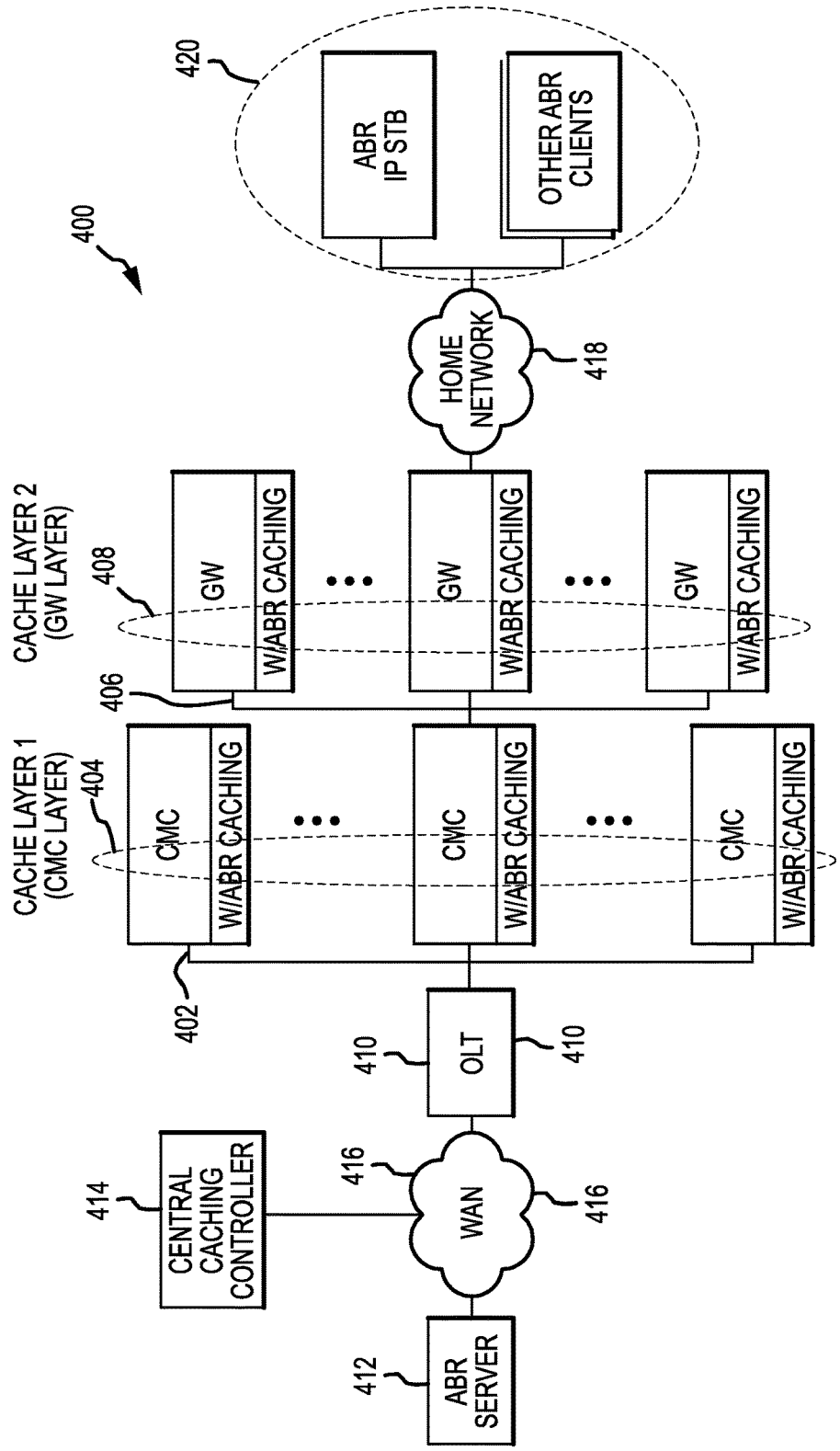
FIG. 4 illustrates an example layered local caching system for adaptive bit rate services in accordance with one or more implementations.

FIG. 4 illustrates an example layered local caching system 400 for adaptive bit rate services in accordance with one or more implementations. The example layered local caching system 400 includes optical distribution network 402, coax media converters 404, cable distribution network 406, gateway devices 408, optical line terminator 410, adaptive bit rate server 412, central caching controller 414, wide area network 416, home communication network 418 and adaptive bit rate clients 420. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The subject disclosure provides several systems and procedures that enhance ABR-based IPTV services in the MDU environment. In particular, they reduce the bandwidth requirements for IPTV services. To provide much more bandwidth-efficient support for IPTV services, a network architecture that supports ABR local caching is provided in the example layered local caching system 400. The example layered local caching system 400 includes the CMC's 404 and GW's 408 that support ABR layered local caching and the central caching controller 414 that coordinates the overall caching operations, as shown in FIG. 4.

In some aspects, the example layered local caching system 400 includes a first network node (sometimes referred to as the coax media converters 404) on a first distribution network (sometimes referred to as the optical distribution network 402) having a first caching controller (not shown). The example layered local caching system 400 also includes a second network node (sometimes referred to as the gateway devices 408) on a second distribution network (sometimes referred to as the cable distribution network 406) having a second caching controller (not shown) and communicatively coupled to the first network node. The example layered local caching system 400 includes the central caching controller 414 that is communicatively coupled to the first network node and configured to control the first caching controller of the first network node. In some aspects, the first caching controller may be configured to control the second caching controller. In one or more implementations, the first network node is configured to store a video segment transmitted on the first distribution network based on a first instruction received by the first caching controller from the central caching controller 414. In some implementations, the second network node is configured to store a video segment transmitted on the second distribution network based on a second instruction received by the second caching controller from the first caching controller.

The hierarchical network arrangement of the ONTs/media converters 404, gateway devices 408, and user devices 420 may be beneficial for unicast transmissions from the headend (e.g., ABR server 412) to the user devices 420, e.g. individual transmissions that are being transmitted from the headend to respective user devices.

The ABR server 412 may be configured to identify the streams that include the same content item and transmit streams to the WAN 416. The ABR server 412 may determine the encoding parameters of the respective streams, identify the segments of the streams, and generate a manifest file that lists the encoding parameters and the available segments. The ABR server 412 may transmit the manifest file to the user devices 218 via the optical and cable distribution networks 402 and 406, respectively, and may provide requested segments to the user devices 218 via the optical and cable distribution networks 402 and 406, respectively.

Rather than having the hierarchical network arrangement experience network congestion when multiple simultaneous unicast transmissions are being transmitted from the headend to the user devices 420, the layered local caching provides for same video segments to be available locally to service requesting clients on a common downstream channel without duplicated transmissions of the video segments, which can congest the downstream channels on either the optical or cable distribution networks thus reducing bandwidth resources.

Figure 5:
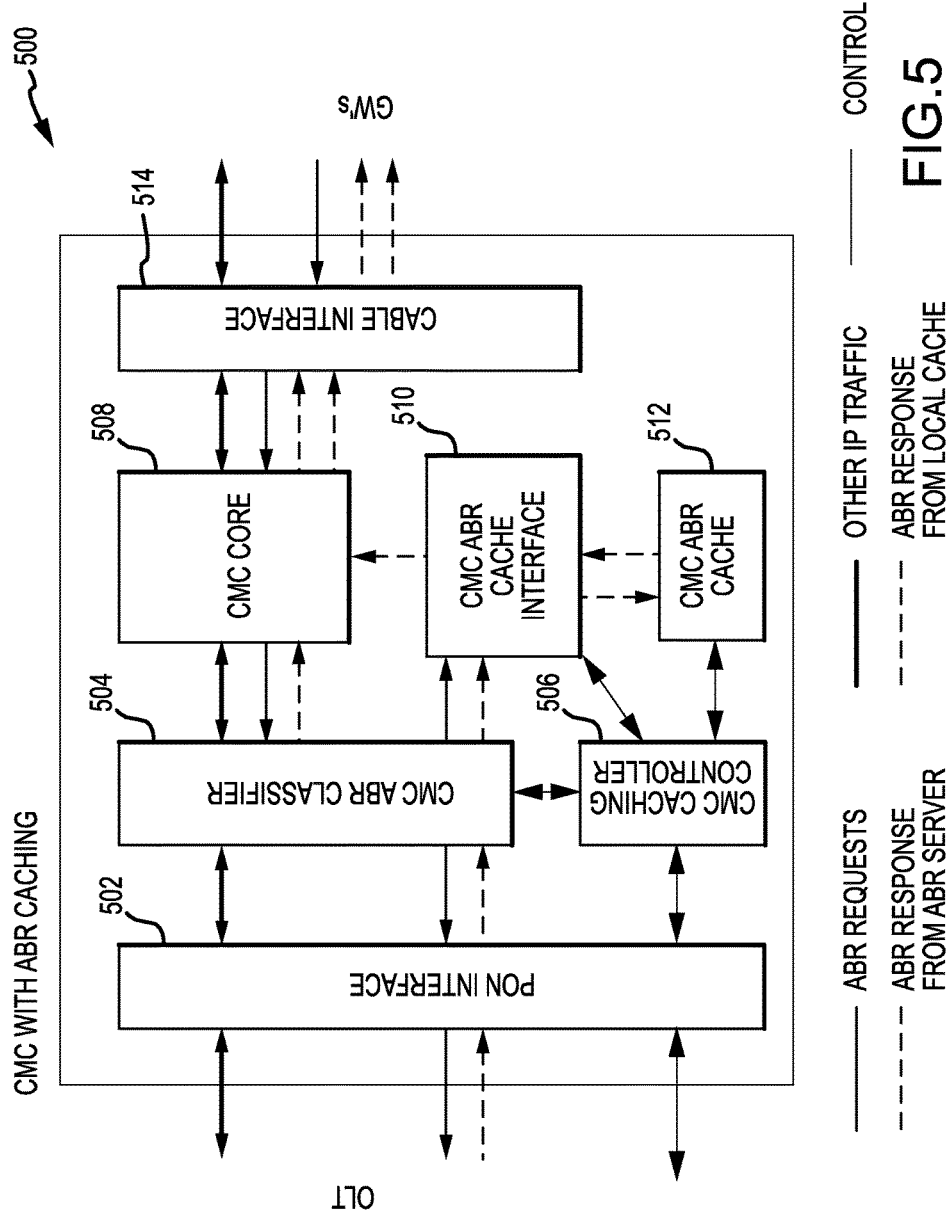
FIG. 5 illustrates an example media converter device that may be used in a layered local caching system for adaptive bit rate services in accordance with one or more implementations.

FIG. 5 illustrates an example media converter device 500 that may be used in a layered local caching system for adaptive bit rate services in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example media converter device 500 includes a passive optical network (PON) interface 502, a coax media converter (CMC) adaptive bit rate (ABR) classifier 504, a CMC caching controller 506, a CMC core 508, a CMC ABR cache interface 510, a CMC ABR cache 512 and a cable interface 514.

Downstream Operation

In some aspects, the PON interface 502 may communicatively couple the media converter device 500 to the OLT 510 via the optical distribution network 502. The media converter device 500 may receive IP streams, such as unicast and/or multicast streams, from the ABR server 212 via the PON interface 502.

In the ABR-enhanced mode, the PON interface 502 may be set to a promiscuous mode, whereby all packets transmitted on a downstream optical channel via the optical distribution network 502 are received and sent to the CMC ABR classifier 504, regardless of whether the received packets are destined to the media converter device 500 or any other CMC on the same downstream channel. Receipt of all the packets allows the media converter device 500 to "see" all ABR-related HTTP responses from the ABR Server 512. These responses may include video segments corresponding to the channels watched by all users on a given optical downstream channel. For example, in a MDU community, if each MDU building is served by one CMC and all CMC's serving the community are on the same optical downstream channel, then each CMC will be able to intercept all video segments associated with the IPTV video channels watched by the entire user population in the community.

The CMC ABR classifier 504 is configured to classify the received packets by the PON interface 502 and separates them into the following 3 types:

For ABR responses from the ABR server 512:

The CMC ABR classifier 504 is configured to forward the response packets to the CMC ABR cache interface 510.

The CMC ABR classifier 504 is configured to duplicate the response packets and forward them to the CMC core 508, if the response packets are destined to the ARB clients behind the media converter device 500 (e.g., clients located downstream on the same downstream channel).

For non-ABR-response packets destined to the media converter device 500:

The CMC ABR classifier 504 is configured to forward the non-ABR-response packets directly to the CMC core 508.

For other packets:

The CMC ABR classifier 504 is configured to discard the other packets, since they are non-ABR-responses packets destined to other CMC's (e.g., other than the media converter 500).

The CMC ABR cache interface 510 is configured to perform the caching of the received video segments contained in ABR responses from the ABR server 512. In some aspects, the caching can be done per IPTV channel. The information about the channel lineup and their mapping to HTTP video segments URL addresses may be configured by a user operator via the CMC caching controller 506. The CMC ABR cache interface 510 can also monitor the storage availability of the CMC ABR cache 512. When the storage is about to be fully used, the CMC ABR cache interface 510 can discard the ABR responses received from the CMC ABR classifier 504 to the CMC core 508, without caching the corresponding video segments.

The CMC ABR cache 512 is a storage module (or memory) for cached video segments. The CMC ABR cache 512 may be configured to buffer, or store, one or more received streams and/or one or more segments of received streams, e.g. for transmission to the user devices 218. The CMC ABR cache 512 may also store associations between segments of streams and time stamps and/or markers.

The CMC core 508 may represent the rest of the main CMC functions needed by the C-DOCSIS architecture. In particular, the CMC core 508 may be responsible for forwarding of packets that have been cached by the CMC ABR cache nterface 510 to the cable interface 514.

The cable interface 514 may represent a radio frequency (RF) interface of the media converter device 500 in the C-DOCSIS architecture. The cable interface 514 may communicatively couple the media converter device 500 to the user devices 218 via the cable distribution network 406.

In some implementations, a method for layered local caching includes facilitating receipt of a request for video content from a downstream client, determining if the requested video content is stored in a local cache, facilitating forwarding of the request to an upstream network node if the requested video content is determined not to be stored in the local cache, facilitating receipt of the requested video content from the upstream network node in response to the forwarded request, storing the received video content in the local cache, and facilitating transmission of the received video content to the downstream client in response to the request.

Upstream Operation

The cable interface 514 is configured to receive packets, including ABR requests, from all GW's connected with the media converter device 500. Cable interface 514 may also forward any locally cached ABR responses to ABR clients located downstream from the media converter 500 on the same cable downstream channel.

The CMC core 508 may forward ABR requests from the ABR clients to the CMC ABR classifier 504. The CMC core 508 may also forward the locally cached ABR responses to the cable interface 514.

The CMC ABR classifier 504 may classify all received packets from the CMC core 508. The CMC ABR classifier 504 may also forward ABR requests that target locally cached video segments to the CMC ABR cache interface 510. In addition, the CMC ABR classifier 504 may forward any other packets (including ABR requests for non-cached video segments) to the passive optical network interface 502.

Based on the received ABR requests from the CMC ABR classifier 504, the CMC ABR cache interface 510 may retrieve the requested video segments form the CMC ABR cache 512, construct appropriate ABR responses, and forward the constructed ABR responses to the CMC core 508 including the retrieved video segments. The CMC ABR cache may send the requested video segments to the CMC ABR cache interface 510 upon request. The PON interface 502 may send all packets received from the CMC ABR classifier 504 on an optical upstream channel.

In some implementations, a method for layered local caching includes facilitating receipt of video content from an upstream network node in response to a request by a first downstream client for the video content, storing the received video content in a local cache if the received video content is not stored in the local cache, and facilitating transmission of the video content from the local cache to a second downstream client in response to a request by the second downstream client.

In some aspects, the example media converter device 500 may include transcoders that are configured to transcode one or more received streams, e.g. to generate additional versions of a content item, such as at bit rates that may be desirable for one or more of the user devices 218.

Figure 6:
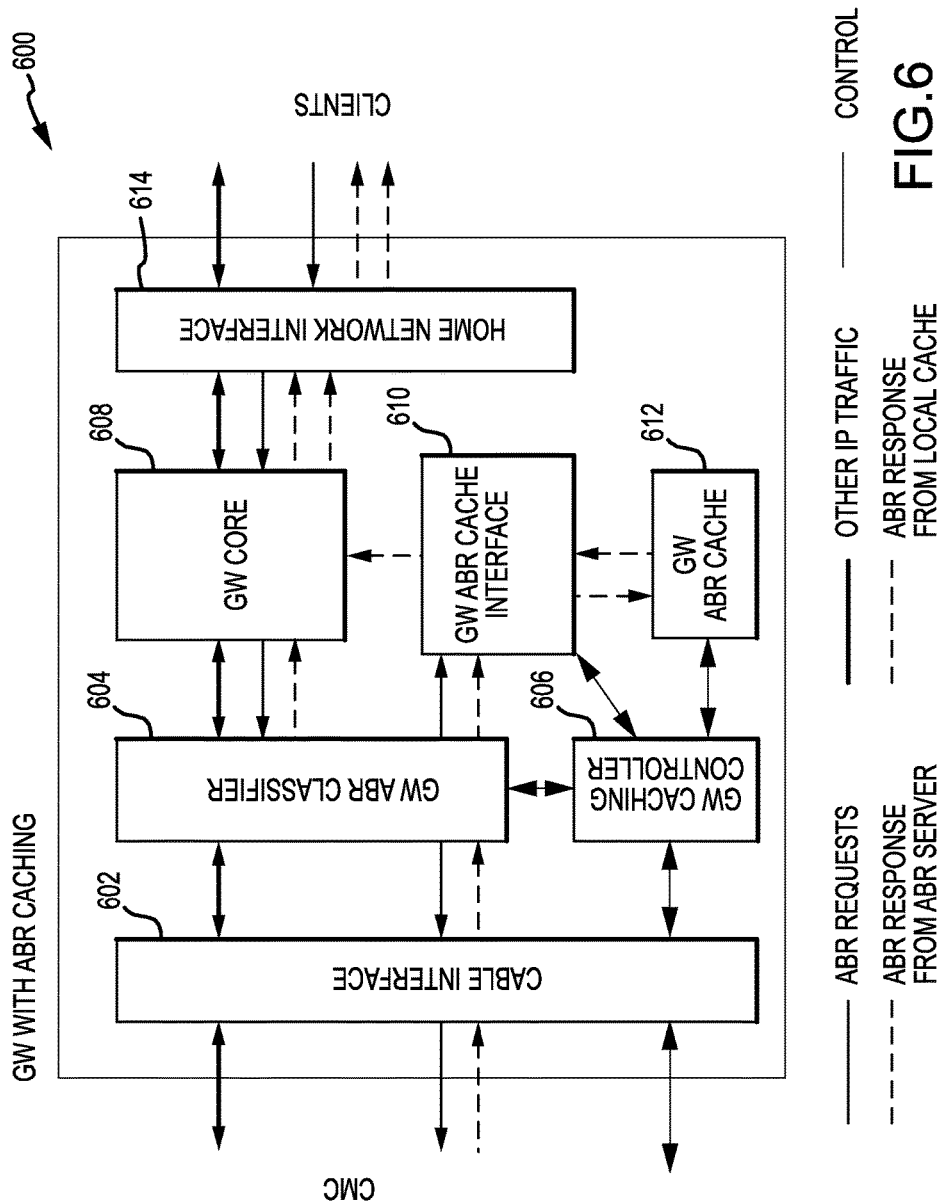
FIG. 6 illustrates an example gateway device that may be used in a layered local caching system for adaptive bit rate services in accordance with one or more implementations.

FIG. 6 illustrates an example gateway device 600 that may be used in a layered local caching system for adaptive bit rate services in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In terms of the support for ABR, the operations of the ABR-enhanced GW are similar to those of the ABR-enhanced CMC shown in FIG. 5. The only differences are: a) the network interfaces are now the cable interface (WAN-facing) and the home communication network interface (LAN-facing), rather than the passive optical network interface and the cable interface, respectively; b) the local caching is now performed for all ABR clients connected to a single CMC downstream channel, rather than for all CMCs connected to a single optical downstream channel.

During the initialization (e.g. power on or reset) of a CMC (e.g., media converter device 500), the CMC caching controller 506 may be configured to contact the central caching controller 414 to obtain a configuration file that contains at least the following information:

A set of programs to be cached. The set of programs represent the content that has common interest among the users served by the CMC. For example, these users belong to the same MDU community.

A set of programs to be cached in the GW's connected to the CMC. The set of programs represent the content that will likely be viewed on multiple clients connected to the GW. The information may be sent to the GW when the GW is initialized.

An aging value for each cached program. The caching may expire after an aging period and the cached program may be removed from the CMC ABR cache 512. For example, daily news programs can be assigned a lower aging value than newly released movies. As such, the daily news programs may be removed from storage sooner than the newly released movies.

During the initialization (e.g. power on or reset) of a GW (e.g., gateway device 600), the GW caching controller 606 may contact the CMC caching controller 506 to obtain a configuration file that contains at least the GW-specific information mentioned above. In addition, the configuration file can also contain the information that is added by the CMC caching controller 506. For example, such information can represent the CMC's own view about what programs may be viewed multiple times or viewed by multiple clients for a given GW, and thus should be cached on the gateway device 600.

During the normal operation of gateway device 600, the GW caching controller 606 may periodically report of caching operations (e.g. cached programs and cache usage) to the CMC caching controller 506. The latter in turn reports caching operations performed by the CMC caching controller 506 to the central caching controller 514. Based on the reported operational data, the higher-level controller (e.g., central caching controller 514 or CMC caching controller 506) can dynamically modify the configuration file of the lower-level controller (e.g., CMC caching controller 506 or GW caching controller 606). The modified configuration file can change the lower-level controller's caching behavior accordingly.

Besides receiving autonomous reports from the lower-level controllers (e.g., GW caching controller 606), the higher-level controller (e.g., CMC caching controller 506) can contact and send modified configuration files to the lower-level controllers at any appropriate time. The modified configuration files are useful to obtain operational status of all of lower-level controllers communicatively coupled to the higher-level controller.

For a received video segment (ABR response), the CMC and GW caching controllers 506 and 606 can check the program information of the video segment against program information contained in the configuration file. As such, the CMC and GW caching controllers 506 and 606 may allow the caching if and only if a match is established. The CMC and GW caching controllers 506 and 606 may remove a cached program if the cached program is aged according to the aging value in the configuration file.

Figure 7:
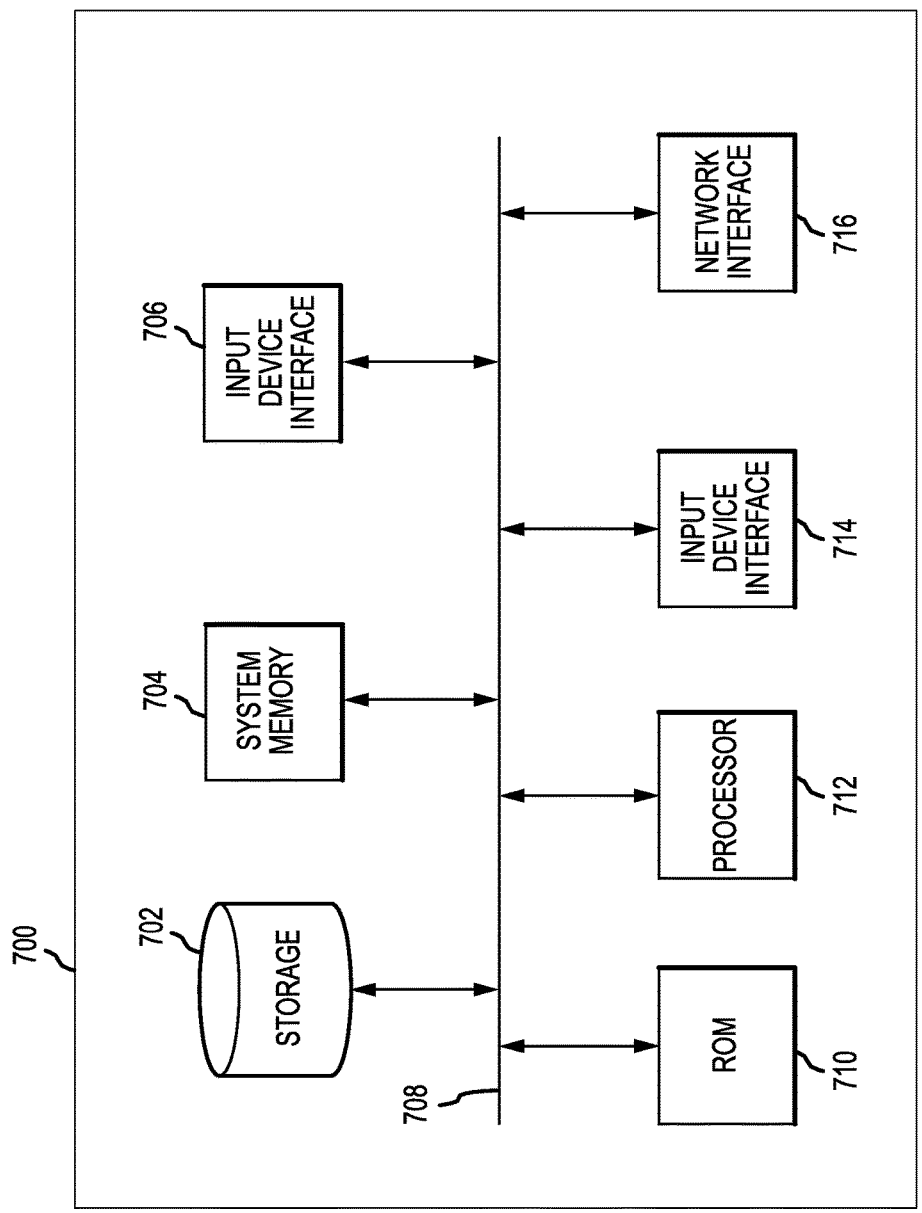
FIG. 7 conceptually illustrates an electronic system with which one or more implementations of the subject technology may be implemented.

FIG. 7 conceptually illustrates an electronic system 700 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The electronic system 700, for example, can be a desktop computer, a laptop computer, a tablet computer, a server, a switch, a router, a base station, a receiver, a phone, a personal digital assistant (PDA), or generally any electronic device that transmits signals over a network. The electronic system 700 can be, and/or can be a part of, the ABR server 212, one or more of the coax media converters 206, one or more of the gateway devices 210, and/or one or more of the user devices 218. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, a local area network (LAN) interface 716, and a wide area network (WAN) interface 718, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to a network (not shown) through the LAN interface 716 and separately, or jointly, through the WAN interface 718. In this manner, the electronic system 700 can be a part of a network of computers, such as a LAN through the LAN interface 716, a WAN through the WAN interface 718, an Intranet through either of the interfaces 716, 718, or a network of networks through either of the interfaces 716, 718, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for layered local caching of downstream shared media in a hierarchical tree network arrangement, comprising:
   a first network node on a first distribution network comprising a first caching controller, the first network node configured to store a video segment transmitted on the first distribution network based on a first instruction received by the first caching controller from a central caching controller communicatively coupled to the first distribution network, wherein the central caching controller is located upstream from the first network node, wherein the first network node comprises:
      a first network interface coupled to the first distribution network and configured to receive packets transmitted on a downstream channel via the first distribution network from a headend server located upstream from the first network node;
      a second network interface coupled to a second distribution network and configured to receive packets transmitted on an upstream channel from a second network node via the second distribution network;
      a core module implemented with one or more processors coupled to the second network interface and configured to forward cached packets to the second network interface;
      a local cache configured to store video packets with indexing;
      a packet classifier implemented with the one or more processors configured to inspect one or more video packets to determine whether the video packets need to be stored in the local cache; and
      a cache interface module implemented with the one or more processors coupled to the packet classifier and configured to control the local cache based on caching policies,
      wherein the packet classifier, in downstream operation, is configured to:
         forward one or more packets to the cache interface module for storage in the local cache if the packet classifier determines that the one or more packets are transmitted from the headend server located upstream in response to a request from a user device located downstream from the first network node;
         forward one or more packets to the core module if the packet classifier determines that the one or more packets are not in response to a previous request transmitted by the first network node but are destined for the first network node; and
         discard one or more packets if the packet classifier determines that the one or more packets are not in response to the previous request and are destined for another network node on the first distribution network; and
   the second network node on the second distribution network comprising a second caching controller and communicatively coupled to the first network node, the second network node configured to store a video segment transmitted on the second distribution network based on a second instruction received by the second caching controller from the first caching controller, wherein the first network node is located upstream from the second network node.

2. The system of claim 1, wherein the central caching controller is configured to provide the first instruction to the first caching controller via a configuration file, wherein the first caching controller is configured to obtain the configuration file during initialization of the first caching controller or dynamically during normal operation.

3. The system of claim 2, wherein the first caching controller is configured to provide the second instruction to the second caching controller via the configuration file, wherein the second caching controller is configured to obtain the configuration file during initialization of the second caching controller or dynamically during normal operation.

4. The system of claim 3, wherein the configuration file comprises caching policies and aging values of stored video segments, wherein the aging values indicate an aging period of when the stored video segments are removed from storage.

5. The system of claim 3, wherein the first caching controller is configured to dynamically modify the configuration file of the second caching controller to control a caching behavior of the second caching controller during the normal operation of the second caching controller.

6. The system of claim 1, wherein the cache interface module is configured to:
   receive the packets from the packet classifier;
   convert the received packets into formatted packets having a client format; and
   forward the formatted packets to the client located downstream via the second network node.

7. The system of claim 1, wherein the packet classifier, in upstream operation, is configured to:
   forward one or more packets to the cache interface module if the packet classifier determines that the one or more packets comprise requests that target video packets stored in the local cache; and forward one or more packets to the first network interface if the packet classifier determines that the one or more packets comprise requests for video packets not stored in the local cache.

8. The system of claim 7, wherein the cache interface module is configured to:
receive the one or more packets from the packet classifier that comprise requests for video packets stored in the local cache;
retrieve the requested video packets from the local cache;
generate one or more responses comprising the retrieved video packets; and
forward the generated responses to the core module.

9. The system of claim 1, wherein the second network node comprises:
a first network interface coupled to the first distribution network configured to receive packets transmitted on a downstream channel via the first distribution network from a headend server located upstream from the first network node;
a second network interface coupled to the second distribution network configured to receive packets transmitted on an upstream channel from the second network node via the second distribution network;
a core module coupled to the second network interface configured to forward cached packets to the second network interface;
a local cache configured to store video packets with indexing;
a packet classifier configured to inspect one or more video packets to determine whether the video packets need to be stored in the local cache; and
a cache interface module coupled to the packet classifier configured to control the local cache based on caching policies.

10. The system of claim 9, wherein in downstream operation:
the packet classifier is configured to:
forward one or more packets to the cache interface module for storage in the local cache if the packet classifier determines that the one or more packets are transmitted from the network node located upstream in response to a request from a client located downstream from the first network node;
forward one or more packets to the core module if the packet classifier determines that the one or more packets are not in response to a previous request but are destined for the first network node; and
discard one or more packets if the packet classifier determines that the one or more packets are not in response to a previous request and are destined for another network node on the first distribution network, and the cache interface module is configured to:
receive the one or more packets from the packet classifier;
convert the received packets into formatted packets having a client format; and
forward the formatted packets to the client located downstream via the second network node.

11. The system of claim 9, wherein in upstream operation:
the packet classifier is configured to:
forward one or more packets to the cache interface module if the packet classifier determines that the one or more packets comprise requests that target video packets stored in the local cache; and
forward one or more packets to the first network interface if the packet classifier determines that the one or more packets comprise requests for video packets not stored in the local cache, and
the cache interface module is configured to:
receive the one or more packets from the packet classifier that comprise requests for video packets stored in the local cache;
retrieve the requested video packets from the local cache;
generate one or more responses comprising the retrieved video packets; and
forward the generated responses to the core module.

12. The system of claim 1, further comprising a plurality of first network nodes on the first distribution network, a plurality of second network nodes on the second distribution network, and a plurality of user devices on a home communication network located downstream from the second distribution network.

13. The system of claim 12, wherein the plurality of first network nodes, the plurality of second network nodes, the central caching controller and the plurality of user devices are arranged in the hierarchical tree network arrangement with the plurality of first network nodes being downstream from the central caching controller, the plurality of second network nodes being downstream from the plurality of first network nodes, and the plurality of user devices being downstream from the plurality of second network nodes.

14. A computer program product comprising code stored in a tangible non-transitory computer-readable storage medium, the code comprising:
code to facilitate receipt of a request for video content from a downstream client over a first network;
code to determine if the requested video content is stored in a local cache;
code to facilitate forwarding of the request to an upstream network node over a second network if the requested video content is determined not to be stored in the local cache, the second network being distinct from the first network;
code to facilitate receipt of the requested video content from the upstream network node over the second network in response to the forwarded request;
code to store the received video content in the local cache when the received video content is transmitted from the upstream network node in response to the request for video content from the downstream client;
code to discard the received video content, without storing the received video content in the local cache, responsive to determining that the received video content is received in response to a previous request transmitted by another network node on the second network and to determining that the received video content is destined for the another network node, the another network node being configured to cache the received video content; and
code to facilitate transmission of the received video content to the downstream client over the first network in response to the request for the video content from the downstream client.

15. The computer program product of claim 14, wherein the code stored in the tangible non-transitory computer-readable storage medium comprises code to facilitate receipt of a configuration file from the upstream network node, the configuration file comprising an instruction to store the received video content in the local cache.

16. A device comprising:
at least one processor configured to:
  facilitate receipt of video content from an upstream network node in response to a request by a first downstream client for the video content, the device being coupled to the upstream network node via a first distribution network and the device being coupled to the first downstream client via a second distribution network that is distinct from the first distribution network;
  store the received video content in a local cache if the received video content is not stored in the local cache and the received video content is received in response to the request;
  discard the received video content, without storing the content in the local cache, responsive to determining that the received video content is received in response to a previous request transmitted by another network node on the first distribution network and to determining that the received video content is destined for the another network node, the another network node being configured to cache the received video content; and
  facilitate transmission of the video content from the local cache to a second downstream client in response to a request by the second downstream client.

17. The device of claim 16, wherein the at least one processor is further configured to facilitate transmission of a configuration file to a downstream network node, the configuration file comprising an instruction to store the transmitted video content in a local cache of the downstream network node, wherein the downstream network node is located upstream from the first and second downstream clients.

* * * * *